United States Patent [19]
Pecore

[11] Patent Number: 5,925,888
[45] Date of Patent: Jul. 20, 1999

[54] OPTOCOUPLER INPUT EXPANSION CIRCUIT

[75] Inventor: Rick A. Pecore, Manitowoc, Wis.

[73] Assignee: Paragon Electric Company, Inc., Two Rivers, Wis.

[21] Appl. No.: 08/853,069

[22] Filed: May 8, 1997

[51] Int. Cl.⁶ .......................... H01H 35/00; H01H 37/00; G12B 29/00
[52] U.S. Cl. .......................... 250/551; 340/501; 340/593
[58] Field of Search ................. 250/551, 214 R, 250/229; 327/18, 20, 50, 63, 70, 514, 518, 519, 520, 531, 584, 587, 588; 324/76.77, 76.79, 76.83; 340/501, 509, 511, 593, 594, 600, 660, 661, 825.04, 825.14, 825.2

[56] References Cited

U.S. PATENT DOCUMENTS

| | | | |
|---|---|---|---|
| 4,017,852 | 4/1977 | Kabat | 340/593 |
| 4,139,878 | 2/1979 | Shuey . | |
| 4,376,277 | 3/1983 | Black, Jr. . | |
| 4,429,231 | 1/1984 | De Loach, Jr. et al. . | |
| 4,567,471 | 1/1986 | Acar | 340/511 |
| 4,678,937 | 7/1987 | Price | 250/551 |
| 4,725,820 | 2/1988 | Kimura | 340/511 |
| 4,752,693 | 6/1988 | Nagano . | |
| 4,864,274 | 9/1989 | Black | 340/501 |
| 4,873,448 | 10/1989 | Shirai . | |
| 5,017,794 | 5/1991 | Linwood et al. | 250/551 |
| 5,079,542 | 1/1992 | Umezawa | 340/593 |
| 5,306,955 | 4/1994 | Fryer . | |
| 5,521,850 | 5/1996 | Moe et al. | 340/501 |

*Primary Examiner*—Edward P. Westin
*Assistant Examiner*—John R. Lee
*Attorney, Agent, or Firm*—Foley & Lardner

[57] ABSTRACT

An electrical system is provided which includes multiple electrical loads which are powered by an AC voltage source. A synchronization circuit generates a synchronization signal which is representative of the half-cycle of the AC voltage source. A load circuit includes multiple AC line-voltage switching devices and the multiple electrical loads. Each AC line-voltage switching device controls the application of power from the AC voltage source to a respective one of the electrical loads. An input circuit senses the multiple AC line-voltage switching devices and generates a single output signal which is representative of the states of the multiple AC line-voltage switching devices. A processing circuit determines the states of the multiple AC line-voltage switching devices based upon the synchronization signal and the single output signal.

26 Claims, 3 Drawing Sheets

OPTOCOUPLER INPUT EXPANSION CIRCUIT

FIELD OF THE INVENTION

The present invention relates generally to the field of monitoring alternating current (AC) line-voltage switching devices. In particular, the invention relates to a circuit and a method of monitoring two AC line-voltage switching devices using the same input circuit.

BACKGROUND OF THE INVENTION

Optocouplers are commonly used to provide electrical isolation between high and low voltage portions of a circuit. Optocouplers usually include a light-emitting diode (LED) and a light-responsive transistor. Electrical isolation occurs because information is transmitted using light emitted by the LED and received by the light-responsive transistor. Optocouplers are also commonly used in circuits as indicators, or as control devices, wherein the light-responsive transistors are energized to control other circuits.

Circuits for monitoring line-voltage switching devices typically monitor only one AC line-voltage switching device (e.g., a switch, thermostat, contactor, etc.) which switches an AC line voltage to an electrical load (e.g., a heater, air conditioner, ice-cube maker, etc.). An input circuit including an optocoupler reads the state of one switching device and generates a single output signal representative thereof. The output signal is coupled to an input pin of a processing circuit (e.g., a microprocessor, microcontroller, programmable logic array, etc.). The processing circuit reads the input pin and determines whether the load is on or off based on whether the input pin is logic low or logic high.

In order to monitor multiple AC line-voltage switching devices, however, the input circuit is usually duplicated for every AC line-voltage switching device being monitored. This duplication of the optocoupler and other circuit components increases cost and requires the use of multiple input pins on the processing circuit. It would be advantageous to design a monitoring circuit capable of reading multiple AC line-voltage switching devices without the necessity of duplicating the input circuit for each switching device and without the need for a single input pin on the processing circuit for each switching device.

In many types of equipment, a synchronization circuit is typically used to generate a sync signal from the AC line voltage to provide a highly-accurate timing signal. The sync signal is generally a 50 Hz or 60 Hz square wave signal with logic low and logic high states which is processed by the processing circuit. This type of circuit typically keeps time in a processor-controlled system where the clock-source (e.g., a sloppy RC network) for the processing circuit is not stable. It would also be advantageous to combine the information provided by the synchronization circuit (i.e., whether the AC voltage source is in a positive AC half-cycle or a negative AC half-cycle) with a single input circuit (instead of several input circuits) to monitor multiple AC line-voltage switching devices.

SUMMARY OF THE INVENTION

A first embodiment of the present invention relates to a monitoring circuit for monitoring multiple AC line-voltage switching devices in an electrical system. Each AC line-voltage switching device controls the application of power from an AC voltage source to a respective electrical load. The electrical system also includes a synchronization circuit which generates a synchronization signal which is representative of the half-cycle of the AC voltage source. The monitoring circuit includes an input circuit which senses the multiple AC line-voltage switching devices and generates a single output signal which is representative of the states of the multiple AC line-voltage switching devices, and a processing circuit which determines the states of the multiple AC line-voltage switching devices based upon the synchronization signal and the single output signal.

Another embodiment of the present invention relates to an electrical system including multiple electrical loads which are powered by an AC voltage source. A synchronization circuit generates a synchronization signal which is representative of the half-cycle of the AC voltage source. A load circuit includes multiple AC line-voltage switching devices and the multiple electrical loads. Each AC line-voltage switching device controls the application of power from the AC voltage source to a respective one of the electrical loads. An input circuit senses the multiple AC line-voltage switching devices and generates a single output signal which is representative of the states of the multiple AC line-voltage switching devices. A processing circuit determines the states of the multiple AC line-voltage switching devices based upon the synchronization signal and the single output signal.

Another embodiment of the present invention relates to a method of monitoring multiple AC line-voltage switching devices in an electrical system. Each AC line-voltage switching device controls the application of power from an AC voltage source to a respective electrical load. A synchronization circuit generates a synchronization signal which is representative of the half-cycle of the AC voltage source. The method comprises sensing the multiple AC line-voltage switching devices, generating a single output signal representative of the states of the multiple AC line-voltage switching devices, and processing the synchronization signal and the single output signal to determine the states of the multiple AC line-voltage switching devices.

Another embodiment of the present invention relates to a monitoring circuit for monitoring two AC line-voltage switching devices in an electrical system wherein each AC line-voltage switching device controls the application of power from an AC voltage source to a respective electrical load, and wherein one of the two AC line-voltage switching devices is never on unless the other AC line-voltage switching device is on. The monitoring circuit includes an input circuit which senses the two AC line-voltage switching devices and generates a single output signal representative of the states of the two AC line-voltage switching devices, and a processing circuit which determines the states of the two AC line-voltage switching devices based upon the single output signal.

DESCRIPTION OF THE DRAWINGS

The preferred exemplary embodiment of this invention will hereinafter be described in conjunction with the appended drawings, wherein like reference numerals denote like elements, and.

DETAILED DESCRIPTION OF A PREFERRED EXEMPLARY EMBODIMENT

Figure 1:
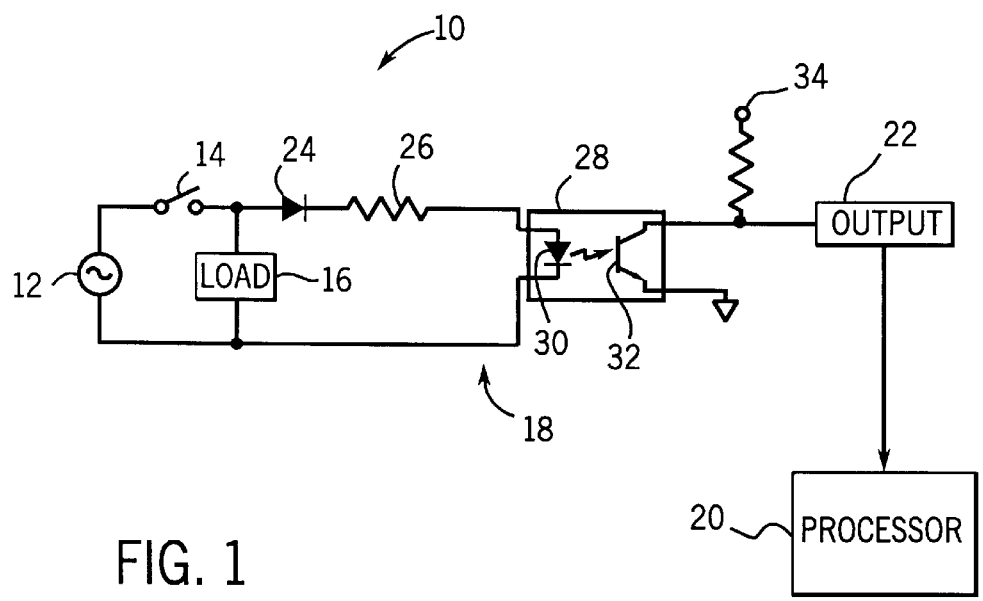
FIG. 1 is a schematic diagram of an electrical system including a standard monitoring circuit used to monitor a single AC line-voltage switching device.

Referring to FIG. 1, an electrical system 10 includes an AC voltage source 12, a single AC line-voltage switching device 14, an electrical load 16, an input circuit 18 and a processing circuit 20. Electrical system 10 monitors single AC line-voltage switching device 14 (e.g., a switch, thermostat, contactor, etc.) which switches AC line voltage from AC voltage source 12 to electrical load 16 (e.g., a heater, air conditioner, ice-cube maker, etc.). Input circuit 18 is coupled to single AC line-voltage switching device 14 and processing circuit 20, generates a single output signal 22 and includes a diode 24, a resistor 26 and an isolation circuit 28.

Isolation circuit 28 includes an optocoupler (e.g., 4N25) having a light-emitting diode 30 and a light-responsive transistor 32. Isolation circuit 28 provides electrical isolation between high and low voltage portions of electrical system 10 by transmitting information using light emitted by light-emitting diode 30 which is received by light-responsive transistor 32. In particular, light-responsive transistor 32 generates single output signal 22 representative of the state (e.g., open or closed) of AC line-voltage switching device 14. A pull-up resistor 34 (e.g., 47K ohm) is coupled to light-responsive transistor 32 of isolation circuit 28 to pull up single output signal 22 when transistor 32 is off. When on, transistor 32 saturates easily so that single output signal 22 typically remains under 0.5V. Diode 24 (e.g., 1N4007) is coupled in series between single AC line-voltage switching device 14 and light-emitting diode 30 to prevent excessive reverse bias on light-emitting diode 30. Additionally, resistor 26 is connected in series with diode 24 to limit current from AC voltage source 12 through light-emitting diode 30.

Single output signal 22, generated by input circuit 18 and representative of the state of single AC line-voltage switching device 14, is coupled to an input pin of processing circuit 20 (e.g., a microprocessor, microcontroller, programmable logic array, etc.). Processing circuit 20 reads the input pin which will be a constant high voltage or a square wave, and determines whether electrical load 16 is on or off based on the state of single AC line-voltage switching device 14. Single output signal 22 is typically 5V when light-responsive transistor 32 is off and is typically under 0.5V when light-responsive transistor 32 is on.

Electrical system 10 is useful for monitoring single line-voltage switching device 14. In order to monitor multiple AC line-voltage switching devices, however, input circuit 18 must usually be duplicated for every AC line-voltage switching device 14 being monitored. In the present embodiment of the current invention, multiple AC line-voltage switching devices are monitored without duplicating input circuit 18 and without using a different input pin for every AC line-voltage switching device 14.

Figure 2:
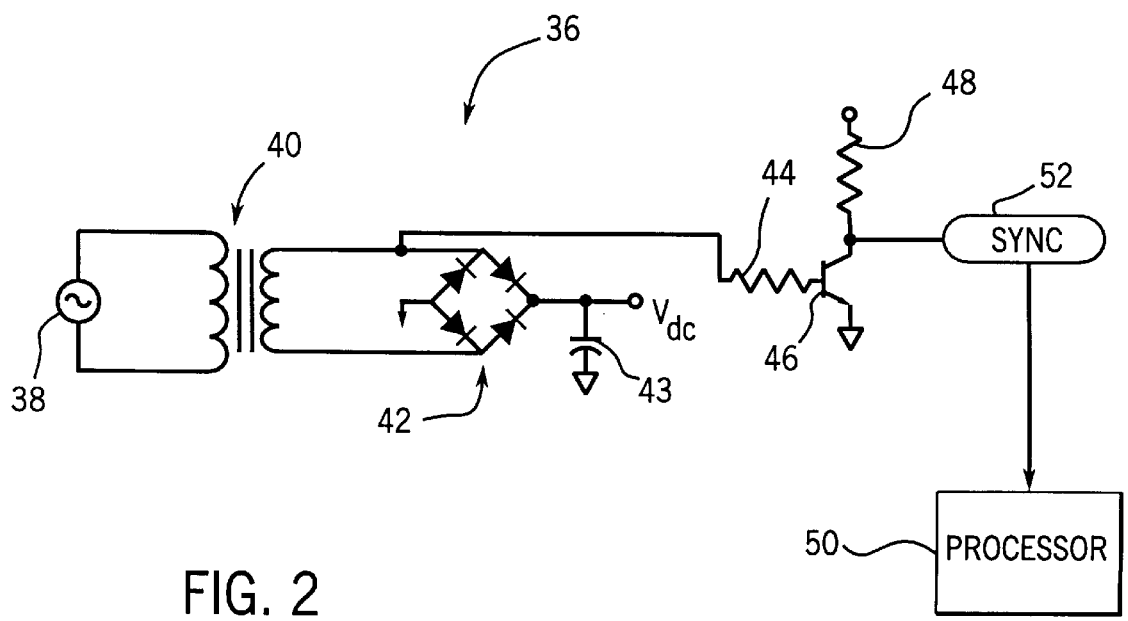
FIG. 2 is a schematic diagram of a synchronization circuit with a logic high or logic low SYNC output signal which represents whether the AC voltage source is in a positive AC half-cycle or a negative AC half-cycle.

Referring to FIG. 2, a synchronization circuit 36 includes an AC voltage source 38, a transformer 40, a full-wave bridge rectifier 42, a capacitor 43, a resistor 44, a transistor 46, a pull-up resistor 48 and a processing circuit 50. Synchronization circuit 36 is commonly used to generate a SYNC signal 52 from AC voltage source 38 which is representative of the half-cycle of AC voltage source 38. SYNC signal 52 is typically a 50 Hz or 60 Hz square wave signal with logic low and logic high states coupled to a first input pin of processing circuit 50 (e.g., a microprocessor, microcontroller, programmable logic array, etc.). Processing circuit 50 samples SYNC signal 52 by reading the first input pin to determine whether SYNC signal 52 is representative of the positive half-cycle or the negative half-cycle of AC voltage source 38. In typical electrical systems, synchronization circuit 36 keeps time in a processor-controlled system where the clock-source (e.g., a sloppy RC network) is not stable. Rectifier 42 and capacitor 43 generate a DC voltage $V_{dc}$ which can be used as a supply voltage for different circuit components.

In one embodiment, transformer 40 produces a $20V_{ac}$ output from a $120V_{ac}$ input, thereby generating a $V_{dc}$ of $24V_{dc}$. In this embodiment, resistor 44 is 10K ohm, pull-up resistor 48 is approximately 47K ohm and transistor 46 is a MPSA06. Transistor 46 is turned on during one of the half-cycles of AC voltage source 38 and turned off during the other half-cycle of AC voltage source 38. In an alternative embodiment of the present invention, transistor 46 and pull-up resistor 48 are replaced with a zener diode, thereby decreasing the cost of synchronization circuit 36.

Figure 3:
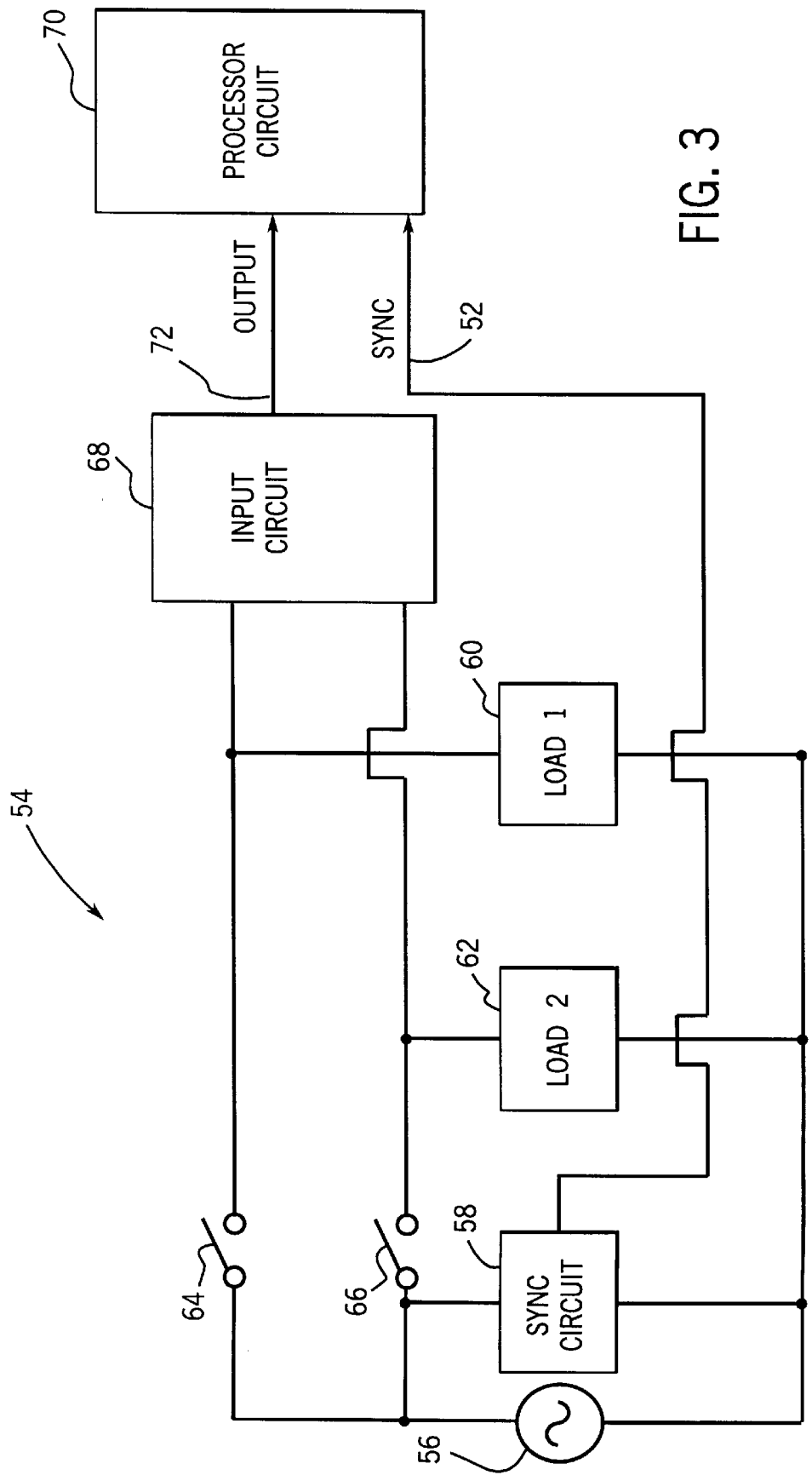
FIG. 3 is a block diagram of an electrical system including monitoring circuit configured to monitor multiple AC line-voltage switching devices.

Referring to FIG. 3, an electrical system 54 includes an AC voltage source 56, a synchronization circuit 58, a first electrical load 60, a second electrical load 62, a first AC line-voltage switching device 64, a second AC line-voltage switching device 66, an input circuit 68 and a processing circuit 70.

Electrical system 54 is configured to control the application of power from AC voltage source 56 to first electrical load 60 and second electrical load 62. As described earlier, synchronization circuit 58 generates SYNC signal 52 representative of the half-cycle of AC voltage source 56. Input circuit 68 is coupled to first AC line-voltage switching device 64 and second AC line-voltage switching device 66. Input circuit 68 senses first and second AC line-voltage switching devices 64, 66 (e.g., switches, contactors, thermostats, etc.) and generates a single output signal 72 representative of the states of first and second AC line-voltage switching devices 64, 66 (and representative of the on/off status of first and second electrical loads 60 and 62). Processing circuit 70, coupled to input circuit 68 and synchronization circuit 58, determines the states of first and second AC line-voltage switching devices 64, 66 based upon SYNC signal 52 and single output signal 72.

Processing circuit 70 (e.g., a microprocessor, microcontroller, programmable logic array, etc.) includes the first input pin coupled to SYNC signal 52 and a second input pin coupled to single output signal 72. In the preferred embodiment of the present invention, processing circuit 70 determines the state of first AC line-voltage switching device 64 by reading the second input pin when the first input pin indicates SYNC signal 52 is representative of the positive half-cycle, and processing circuit 70 determines the state of second AC line-voltage switching device 66 by reading the second input pin when the first input pin indicates SYNC signal 52 is representative of the negative half-cycle.

Figure 4:
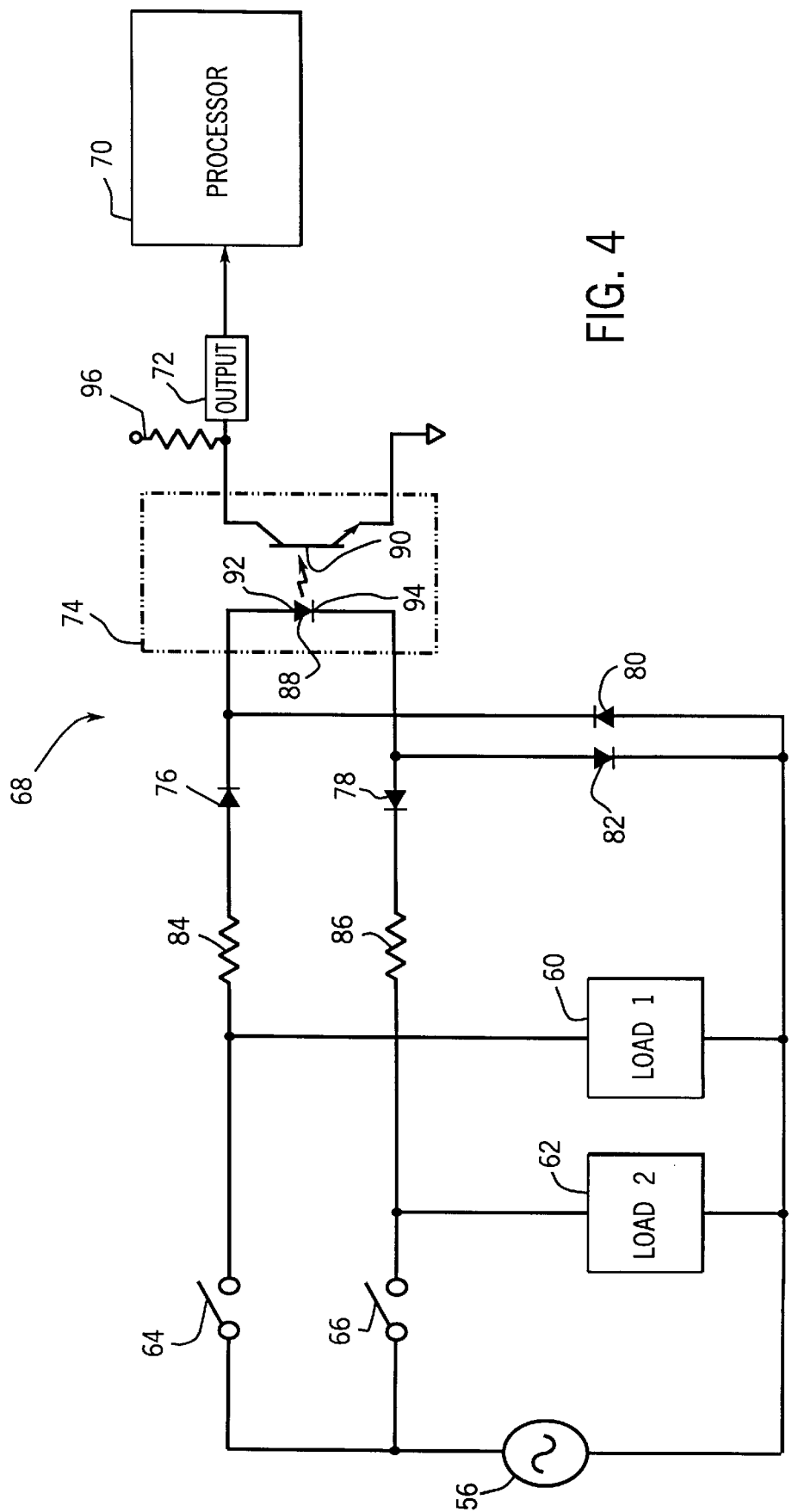
FIG. 4 is a schematic diagram of an electrical system including a load circuit, an input circuit and a processing circuit configured to monitor multiple AC line-voltage switching devices.

Referring to FIG. 4, input circuit 68 includes an isolation circuit 74, a first diode 76, a second diode 78, a third diode 80, a fourth diode 82, a first resistor 84, and a second resistor 86. Isolation circuit 74 is electrically coupled to first and second AC line-voltage switching devices 64, 66 and includes a light-emitting diode 88 and a light-responsive transistor 90 (e.g., 4N25). Light-responsive transistor 90 generates single output signal 72 representative of the states of first and second AC line-voltage switching devices 64, 66.

First diode 76, in series between a first terminal 92 of light-emitting diode 88 and first AC line-voltage switching device 64, is biased to conduct current during the positive AC half-cycle. Second diode 78, in series between a second terminal 94 of light-emitting diode 88 and second AC line-voltage switching device 66, is biased to conduct current during the negative AC half-cycle. First resistor 84 is connected in series with first AC line-voltage switching device 64 and second resistor 86 is connected in series with second AC line-voltage switching device 66. First and second resistors 84, 86 (e.g., 47K) limit current from AC voltage source 56 through light-emitting diode 88. Third diode 80 is coupled between first diode 76 and AC voltage source 56 and fourth diode 82 is coupled between second diode 78 and AC voltage source 56. In the preferred embodiment of the current invention, first diode 76, second diode 78, third diode 80 and fourth diode 82 are 1N4007 diodes.

Processing circuit 70 reads the second input pin coupled to single output signal 72 to determine that first and second AC line-voltage switching devices 64, 66 are in a first state (e.g., open) when single output signal 72 remains constant at a certain first voltage (e.g., 5V) for a predetermined amount of time (e.g., the period of the AC signal), and that first and second AC line-voltage switching devices 64, 66 are in a second state (e.g., closed) when single output signal 72 remains constant at a certain second voltage (e.g., below 0.5V) for the predetermined amount of time. Note that the voltage at single output signal 72 will rise momentarily during the transition from the positive AC half-cycle to the negative, as light-responsive transistor 90 leaves saturation during this time. If single output signal 72 toggles between the first voltage and the second voltage, processing circuit 70 determines the states of first and second AC line-voltage switching devices 64, 66 based upon the first input pin coupled to SYNC signal 52 which indicates the half-cycle of AC voltage source 56.

In particular, on the positive half-cycle of AC voltage source 56, if first AC line-voltage switching device 64 is closed, current flows through first AC line-voltage switching device 64, first resistor 84, first diode 76, light-emitting diode 88, fourth diode 82 and back to AC voltage source 56. Light emitted by light-emitting diode 88 energizes light-responsive transistor 90 (isolation circuit 74 ON) and generates a LOW single output signal 72. The collector of light-responsive transistor 90 receives current through a pull-up resistor 96 and the emitter of light-responsive transistor 90 feeds the current to ground.

On the positive half-cycle of AC voltage source 56, if first AC line-voltage switching device 64 is open, current is unable to flow from AC voltage source 56 to light-emitting diode 88. Light-emitting diode 88 is not energized (isolation circuit 74 OFF) and light-responsive transistor 90 is OFF, thereby generating a HIGH single output signal 72.

On the negative half-cycle of AC voltage source 56, if second AC line-voltage switching device 66 is closed, current flows through third diode 80, light-emitting diode 88, second diode 78, second resistor 86, second AC line-voltage switching device 66 and back to AC voltage source 56. Light emitted by light-emitting diode 88 energizes light-responsive transistor 90 (isolation circuit 74 ON) and generates a LOW single output signal 72. The collector of light-responsive transistor 90 receives current through pull-up resistor 96 and the emitter of light-responsive transistor 90 feeds the current to ground.

Finally, on the negative half-cycle of AC voltage source 56, if second AC line-voltage switching device 66 is open, current is unable to flow from AC voltage source 56 to light-emitting diode 88. Light-emitting diode 88 is not energized (isolation circuit 74 OFF) and light-responsive transistor 90 is OFF, thereby generating a HIGH single output signal 72.

Therefore, if processing circuit 70 determines that single output signal 72 is toggling between a relatively high voltage and a relatively low voltage by reading the second input pin coupled to single output signal 72, processing circuit 70 determines whether first or second line-voltage switching devices 64, 66 is closed by reading the first input pin coupled to SYNC signal 52. In the preferred embodiment of the current invention, if SYNC signal 52 is representative of the positive AC half-cycle, first line-voltage switching device 64 is being monitored. On the other hand, if SYNC signal 52 is representative of the negative half-cycle, second line-voltage switching device 66 is being monitored. For example, if SYNC signal 52 is representative of the positive half-cycle and single output signal 72 is high, then first line-voltage switching device 64 is open (and first electrical load 60 is off). If SYNC signal 52 is representative of the negative half-cycle and single output signal 72 is high, then second line-voltage switching device 66 is open (and second electrical load 62 is off). If SYNC signal 52 is representative of the positive half-cycle and single output signal 72 is low, then first line-voltage switching device 64 is closed (and first electrical load 60 is on). Finally, if SYNC signal 52 is representative of the negative half-cycle and single output signal 72 is low, then second line-voltage switching device 66 is closed (and second electrical load 62 is on).

In an alternative embodiment of the present invention, processing circuit 70 determines the states of first and second line-voltage switching devices 64, 66 by reading only the second input pin coupled to single output signal 72. The reading of the first input pin coupled to SYNC signal 52 is unnecessary if, in a particular electrical system, one of first or second line-voltage switching devices 64, 66 is never on unless the other AC line-voltage switching device 64, 66 is on. In fact, synchronization circuit 58 is not needed in such an electrical system. In some electrical systems, for example, there is a strict dependency between systems. For example, an electrical system may prevent a heater from being turned on unless a fan is running to disperse the heated air and avoid an overheat condition. In this example, if first line-voltage switching device 64 controls the heater and second line-voltage switching device 66 controls the fan, and single output signal 72 is toggling between a first state and a second state, processing circuit 70 can determine that second line-voltage switching device 66 (e.g., the fan switch) is closed and that first line-voltage switching device 64 (e.g., the heater switch) is open because first line-voltage switching device 64 cannot be closed by itself due to the assumed dependency of the electrical system.

In the preferred embodiment of the current invention, first and second AC line-voltage switching devices 64, 66 are monitored by sensing first and second AC line-voltage switching devices 64, 66, generating single output signal 72 representative of the states (e.g., open or closed) of first and second line-voltage switching devices 64, 66, and processing SYNC signal 52 and single output signal 72 to determine the states of first and second line-voltage switching devices 64, 66. For example, first line-voltage switching device 64 is sensed when SYNC signal 52 is representative of the positive half-cycle of AC voltage source 56 and second line-voltage switching device 66 is sensed when SYNC signal 52 is representative of the negative half-cycle of AC voltage source 56.

It is understood that the above description is of a preferred exemplary embodiment of this invention, and that the invention is not limited to the specific forms described. For example, a device other than an optocoupler may be used to provide electrical isolation in electrical system 54 and input circuit 68 may include another diode configuration so that second line-voltage switching device 66 is read on the positive AC half-cycle and first line-voltage switching device 64 is read on the negative AC half-cycle. These and other modifications may be made in the design and arrangement of the elements without departing from the scope of the invention as expressed in the appended claims.

I claim:

1. A monitoring circuit for monitoring multiple AC line-voltage switching devices in an electrical system, each AC line-voltage switching device being configured to control the application of power from an AC voltage source to a respective electrical load, the electrical system further including a synchronization circuit which generates a synchronization signal representative of the half-cycle of the AC voltage source, the monitoring circuit comprising:

an input circuit configured to sense the multiple AC line-voltage switching devices and to generate a single output signal representative of the states of the multiple AC line-voltage switching devices; and a processing circuit coupled to the input circuit and the synchronization circuit, the processing circuit configured to determine the states of the multiple AC line-voltage switching devices based upon the synchronization signal and the single output signal.

2. The monitoring circuit of claim 1, wherein the processing circuit includes a first input pin coupled to the synchronization signal and a second input pin coupled to the single output signal.

3. The monitoring circuit of claim 1, wherein the processing circuit is selected from the group consisting of a microprocessor, a microcontroller and a programmable logic array.

4. The monitoring circuit of claim 1, wherein the processing circuit is configured to determine the state of one of the multiple AC line-voltage switching devices from the single output signal when the synchronization signal is representative of the positive half-cycle, and to determine the state of the other one of the multiple AC line-voltage switching devices from the single output signal when the synchronization signal is representative of the negative half-cycle.

5. The monitoring circuit of claim 1, wherein the input circuit comprises:

an isolation circuit including a light-emitting diode and a light-responsive transistor, the isolation circuit electrically coupled to the multiple AC line-voltage switching devices, the light-responsive transistor generating the single output signal representative of the states of the multiple AC line-voltage switching devices.

6. The monitoring circuit of claim 5, wherein the input circuit further comprises:

a first diode coupled in series between a first terminal of the light-emitting diode and one of the AC line-voltage switching devices, the first diode biased to conduct current during the positive AC half-cycle; and a second diode coupled in series between a second terminal of the light-emitting diode and the other one of the AC line-voltage switching devices, the second diode biased to conduct current during the negative AC half-cycle.

7. The monitoring circuit of claim 6, wherein the input circuit further comprises a third diode coupled between the first diode and the AC voltage source, and a fourth diode coupled between the second diode and the AC voltage source.

8. The monitoring circuit of claim 6, wherein the input circuit further comprises a first and a second resistor connected in series with the first and second diode, respectively, to limit current from the AC voltage source through the light-emitting diode.

9. The monitoring circuit of claim 1, wherein the multiple AC line-voltage switching devices are selected from the group consisting of a plurality of switches, a plurality of contactors and a plurality of thermostats.

10. An electrical system including multiple electrical loads powered by an AC voltage source, comprising:

a synchronization circuit configured to generate a synchronization signal representative of the half-cycle of the AC voltage source;

a load circuit including multiple AC line-voltage switching devices and the multiple electrical loads, each AC line-voltage switching device configured to control the application of power from the AC voltage source to a respective one of the electrical loads;

an input circuit coupled to the load circuit, the input circuit configured to sense the multiple AC line-voltage switching devices and to generate a single output signal representative of the states of the multiple AC line-voltage switching devices; and a processing circuit coupled to the synchronization circuit and the input circuit, the processing circuit configured to determine the states of the multiple AC line-voltage switching devices based upon the synchronization signal and the single output signal.

11. The electrical system of claim 10, wherein the synchronization circuit includes a transistor turned on during one of the half-cycles of the AC voltage source and turned off during the other of the half-cycles.

12. The electrical system of claim 11, wherein the synchronization circuit further includes a pull-up resistor coupled to the transistor.

13. The electrical system of claim 10, wherein the synchronization circuit includes a zener diode.

14. The electrical system of claim 10, wherein the input circuit comprises:

an isolation circuit including a light-emitting diode and a light-responsive transistor, the isolation circuit electrically coupled to the multiple AC line-voltage switching devices, the light-responsive transistor generating the single output signal representative of the states of the multiple AC line-voltage switching devices.

15. The electrical system of claim 14, wherein the input circuit further comprises a first diode coupled in series between one of the AC line-voltage switching devices and the isolation circuit, and a second diode coupled in series between the other one of the AC line-voltage switching devices and the isolation circuit.

16. The electrical system of claim 15, wherein the input circuit further comprises a third diode coupled between the first diode and the AC voltage source, and a fourth diode coupled between the second diode and the AC voltage source.

17. The electrical system of claim 15, wherein the input circuit further comprises a first and a second resistor connected in series with the first and the second diode, respectively, to limit current from the AC voltage source through the light-emitting diode.

18. The electrical system of claim 10, wherein the processing circuit is configured to determine the state of one of the multiple AC line-voltage switching devices from the single output signal when the synchronization signal is representative of the positive half-cycle, and to determine the state of the other one of the multiple AC line-voltage switching devices from the single output signal when the synchronization signal is representative of the negative half-cycle.

19. A method of monitoring multiple AC line-voltage switching devices in an electrical system, each AC line-voltage switching device being configured to control the application of power from an AC voltage source to a respective electrical load, the electrical system further including a synchronization circuit which generates a synchronization signal representative of the half-cycle of the AC voltage source, the method comprising the steps of:

sensing the multiple AC line-voltage switching devices;

generating a single output signal representative of the states of the multiple AC line-voltage switching devices; and processing the synchronization signal and the single output signal to determine the states of the multiple AC line-voltage switching devices.

20. The method of monitoring multiple AC line-voltage switching devices of claim 19, wherein the sensing step includes sensing one of the AC line-voltage switching devices when the synchronization signal is representative of the positive half-cycle of the AC voltage source, and sensing the other one of the AC line-voltage switching devices when the synchronization signal is representative of the negative half-cycle of the AC voltage source.

21. The method of monitoring multiple AC line-voltage switching devices of claim 19, wherein the processing step includes determining the state of one of the multiple AC line-voltage switching devices from the single output signal when the synchronization signal is representative of the positive half-cycle, and determining the state of the other one of the multiple AC line-voltage switching devices from the single output signal when the synchronization signal is representative of the negative half-cycle.

22. A monitoring circuit for monitoring two AC line-voltage switching devices in an electrical system, each AC line-voltage switching device being configured to control the application of power from an AC voltage source to a respective electrical load, and wherein one of the two AC line-voltage switching devices is never on unless the other AC line-voltage switching device is on, the monitoring circuit comprising:

an input circuit configured to sense the two AC line-voltage switching devices and to generate a single output signal representative of the states of the two AC line-voltage switching devices; and a processing circuit coupled to the input circuit, the processing circuit configured to determine the states of the two AC line-voltage switching devices based upon the single output signal.

23. The monitoring circuit of claim 22, wherein the processing circuit includes an input pin coupled to the single output signal.

24. The monitoring circuit of claim 22, wherein the processing circuit is selected from the group consisting of a microprocessor, a microcontroller and a programmable logic array.

25. The monitoring circuit of claim 22, wherein the processing circuit is configured to determine that the multiple AC line-voltage switching devices are in a first state when the single output signal remains in a first state, the multiple AC line-voltage switching devices are in a second state when the single output signal remains in a second state, and one of the multiple AC line-voltage switching devices is in the first state and the other one of the multiple AC line-voltage switching devices is in the second state when the single output signal toggles between the first state and the second state.

26. The monitoring circuit of claim 22, wherein the input circuit comprises:

an isolation circuit including a light-emitting diode and a light-responsive transistor, the isolation circuit electrically coupled to the two AC line-voltage switching devices, the light-responsive transistor generating the single output signal representative of the states of the two AC line-voltage switching devices.

* * * * *